Jan. 8, 1963 J. J. KURLAND ETAL 3,072,831
MINIATURE CAPACITOR AND METHOD OF MAKING SAME
Filed Dec. 5, 1958
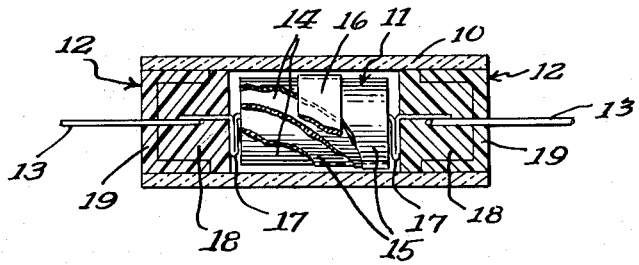
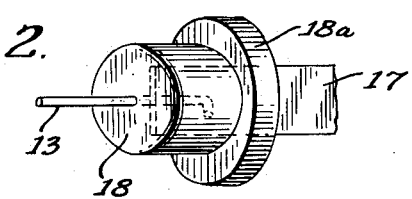
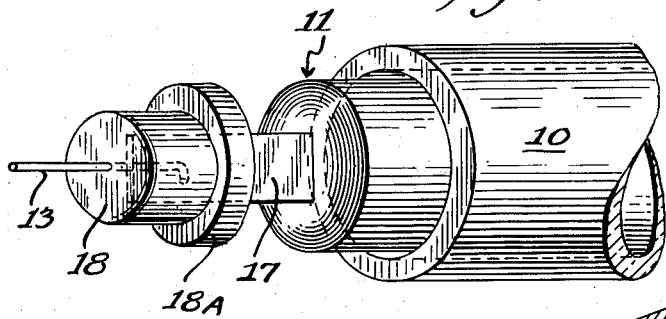
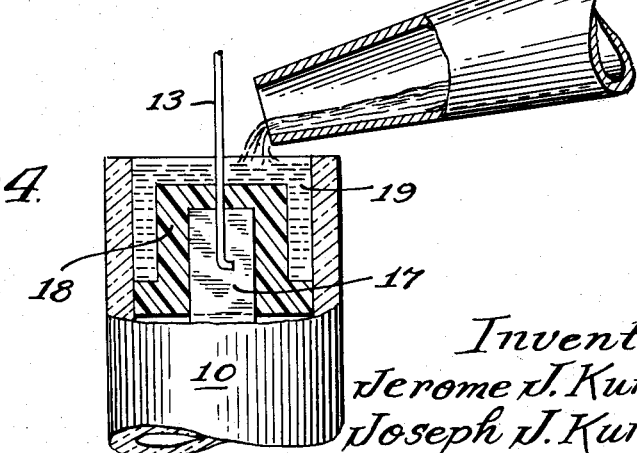
Inventors
Jerome J. Kurland
Joseph J. Kurland
By Mann, Brown & McWilliams
Attys.

United States Patent Office 3,072,831
Patented Jan. 8, 1963

3,072,831
MINIATURE CAPACITOR AND METHOD
OF MAKING SAME
Jerome J. Kurland, 2725 W. Fitch St., Chicago, Ill., and
Joseph J. Kurland, 188 Park Ave., Glencoe, Ill.
Filed Dec. 5, 1958, Ser. No. 778,495
5 Claims. (Cl. 317—230)

This invention relates to capacitors and, more particularly, is concerned with miniature capacitors of the electrolytic type and has for its principal object the provision of a miniature electrolytic capacitor that includes a casing of ceramic or similar material having an open end through which a connection terminal projects, with a solid, incompressible insulator body of air and moisture-resistant mold material being provided to establish a hermetic seal between the terminal and the casing.

Another object of the invention is to provide an improved method for constructing such a capacitor that facilitates handling, assembling and testing of the various parts of the capacitor while minimizing problems of breakage, corrosion, and contamination.

Briefly, this is accomplished by initially forming a small-size protection bead of mold material about the connection terminal, with this bead being arranged to encapsulate the juncture between the usual aluminum riser and the external copper or non-film-forming wire for protecting the mechanical and electrical characteristics of the juncture during the various handling, assembling and testing operations. With the capacitor otherwise completely assembled and the bead disposed in the open end of the ceramic casing with a suitable clearance space therebetween, additional mold material is supplied and fills the clearance space to complete the cap structure and form a hermetic seal between the protection bead and the ceramic casing.

Preferably, the inner end of the protection bead is larger than the outer end and occupies substantially the entire cross section of the open end of the casing to act as a barrier that protects the capacitor body and electrolyte against ingress of mold material during the final capping operation.

Other objects and advantages will become apparent during the course of the following description.

In the accompanying drawings forming a part of this specification and in which like numerals are employed to designate like parts throughout the same;

FIG. 1 is a longitudinal, sectional view through a capacitor constructed in accordance with this invention, with parts thereof broken away to better illustrate the disclosure;

FIG. 2 is a perspective view illustrating the initial stage in the preparation of the terminal cap of the capacitor of FIG. 1;

FIG. 3 is a perspective view illustrating the sub-assembly comprising the capacitor pack, the electrical terminal, and the cap structure being inserted in the capacitor casing through an open end thereof; and FIG. 4 is a diagrammatic view, with parts broken away and sectioned, illustrating the final formation of the cap structure of the capacitor.

Referring now to the drawings, for purposes of disclosure, the invention is illustrated in connection with the construction of a miniature type electrolytic capacitor that is shown in its completed form in FIG. 1 as comprising a hollow, open-ended ceramic case 10 that is preferably of cylindrical form, a capacitor pack 11 suitably saturated with electrolyte, and seprately formed cap structures 12 sealing the opposite open ends of the casing and providing an external electrical connection terminal 13 at each end of the casing.

The capacitor pack 11 may comprise a plurality of foils 14 of aluminum or other suitable material arranged in alternating, overlying relation with a plurality of layers of insulation 15, which may be of paper, with the stack of layers being suitably wound to form a cylindrical pack that is preferably secured in wound condition by a band of cellophane tape 16.

In the illustrated arrangement the capacitor pack has two layers of aluminum foil 14 with a riser 17 in the form of a relatively wide, flat strip of aluminum fixed to each foil by staking or other equivalent means. Each riser 17 is connected to one of the external connection wires 13, which may be tin-coated copper or brass wire, to form a juncture of dissimilar metals. The risers and connection wires are poined by spot-welding or equivalent means to provide a strong mechanical and electrical connection at their junctures.

The cap structure 12 of the capacitor is molded about and encases the juncture to form a solid encapsulation bead that completely surrounds the juncture and fills the open end of the casing to provide a hermetic seal. Any dielectric material that can be cast and that is resistant to air and moisture and to chemical attack in the presence of various types of electrolytes is suitable for forming the encapsulation bead on the juncture. Certain resins, for example, are suitable: the epoxy resins, the polyester resins, and phenol and condensation resins.

Other desirable properties which the encapsulation material preferably should possess are high tensile and shock strength, excellent insulation resistance, stability at high temperatures, and stability in the presence of the various capacitor fill materials and any other materials that are employed in the fabrication of the capacitor. One or more or these last-mentioned properties may or may not be required, depending upon the particular application, as will be apparent to those skilled in the art.

While it is preferred that the encapsulation bead be formed of hard, incompressible insulation material, it may also be cast of rubber or rubber and plastic compounds such as are marketed under the trade name "Thiokol" by Thiokol Corp., as will be apparent to those skilled in this art.

According to the present invention, the cap structure is formed in two stages and comprises an initial protection bead 18 that is encapsulated directly over the juncture, preferably immediately after its formation, and a final filler 19 that is applied in situ in the open end of the casing to fill such space as exists between the initial small-sized protection bead 18 and the walls of the casing. While the molded body of the cap structure is formed in two stages, a fact which is normally readily apparent upon visual inspection of the final product, for all intents and purposes it functions as a unitary, homogeneous body as respects its sealing qualities, its ruggedness, etc.

In the preferred practice of this invention, the order of steps in the construction of the capacitor are as follows: (1) joining the riser 17 to the external lead wire 13; (2) encapsulating a solid protection bead about the juncture; (3) staking the riser to the capacitor foil; (4) assembling the requisite number of foils 14 in alternating relation with suitable layers of insulation 15 and winding the entire pack simultaneously; (5) inserting the assembly of the capacitor pack, the electrical terminal and the cap structure in an open-ended casing; and (6) filling the space between the protection bead and the side walls of the casing with mold material.

Future techniques may permit of altering the order of certain of these steps without departing from the teachings of the present invention, which is concerned with providing the protection bead immediately after the formation of the juncture.

In the rapidly growing miniature capacitor field, unique problems exist in handling the minute parts during the various stages of fabrication, processing and testing, and particular difficulties have existed in achieving true hermetic seals for these small-size devices. In Patent No. 2,803,693 and in our copending application, Serial No. 664,537, filed June 10, 1957, which issued as Patent No. 2,987,800, on June 6, 1961, the disclosures of which, to the extent that they are not inconsistent herewith, are specifically incorporated by reference, there is a further discussion of these problems and certain solutions are disclosed.

Problems of breakage and contamination of the fragile parts are substantially eliminated by forming a protective encapsulation bead about the juncture immediately following the formation of the juncture (see FIG. 2). The bead 18 protects and reinforces this notably frail juncture to such an extent that the part may be handled roughly without any fear of damaging the juncture. Invariably, either the external connection wire 13 or the riser 17 would fail before the juncture. In addition, the protection bead immediately excludes air and moisture or other contaminating liquids that attack the juncture during and after fabrication of the capacitor.

In present-day practice, it is conventional to test capacitors to determine that they meet the desired specifications and performance characteristics, and this involves such considerable handling that it has not heretofore been practicable to test the capacitor until after it was assembled in its casing.

In the practice of this invention, the presence of the initial protection bead permits the assembly of the capacitor pack, the electrical terminal and the bead to be soaked in electrolyte and then tested prior to its insertion in the casing. Should the testing procedure reveal any discrepancies, such, for example, as may be remedied by additional soaking in electrolyte, this can be carried out quickly and without waste of material. After testing, the parts are inserted into the casing, as indicated in FIG. 3, and are arranged therein as illustrated in FIG. 4, wherein a limited peripheral clearance exists between the initial protection bead 18 and the side walls of the casing adjacent the open end. At this point, additional filler material is molded in situ within the open end of the casing to completely fill this clearance space and establish a hermetic seal for the end of the casing. The filler and the initial protection bead may be of the same or different materials so long as they bond to form a true hermetic seal.

An important feature of the present invention resides in the fact that the initial bead 18 is larger at its inner end than at its outer end and in the form illustrated in this disclosure, the bead is generally cylindrical and includes an annular shoulder 18A at its inner end having a diameter at its outer circumference on the order of the diameter of the open end of the casing such that the shoulder 18A, when the bead is in place within the casing, acts as a barrier preventing ingress of mold material to the region occupied by the capacitor pack during the final forming of the cap structure, and this prevents damage to the capacitor pack and avoids contamination of the electrolyte.

While the invention has been described in relation to miniature capacitors of the electrolytic type, its application to other types of capacitors, such as electrostatic, wax or oil-impregnated, or other comparable devices will be apparent to those skilled in this art.

It should be understood that the description of the preferred form of the invention is for the purpose of complying with Section 112, Title 35, of the U.S. Code and that the claims should be construed as broadly as prior art will permit.

We claim:

1. The method of manufacturing a capacitor of the type that includes a casing having an open end, a wound capacitor pack in said casing and including a riser adjacent the open end of said casing, an external terminal mechanically and electrically connected to said riser to form a juncture, and a solid body of air and moisture-resistant mold material in surrounding, sealing engagement about said juncture and filling the open end of said casing to provide a hermetic seal therefor, said method comprising the steps of forming an assembly of a capacitor pack, a riser, an external terminal forming a juncture with said riser, and a protection bead of said mold material encasing the juncture, inserting the assembly in the casing with the bead disposed in the open end thereof and with the external terminal projecting therethrough, and filling the space between the bead and the walls of the casing with additional mold material to complete the formation of said body and create direct contact with the walls of said casing to provide a hermetic seal for the open end of said casing, said method also including the step of initially forming the protection head with an enlarged inner end having a cross-sectional dimension corresponding to that of the open end of the casing to act as a barrier that protects the capacitor pack against ingress of mold material during the final formation of said body.

2. In a capacitor, the combination of a sleeve-like casing having an open end, a capacitor pack disposed in the casing and having a riser adjacent the open end of the casing, an external terminal mechanically and electrically connected to said riser to form a juncture, an encapsulation bead of air and moisture-resistant insulating mold material completely encasing said juncture and forming a solid body that completely seals the juncture, said body being smaller in cross-sectional dimensions at its outer end than the open end of said casing and being disposed therein with a clearance space therebetween, said body having an integral shoulder adjacent its inner end and extending about the entire periphery thereof for snug fitting relation within the casing, and a filler of air and moisture-resistant insulating mold material disposed in direct surrounding contacting relation about said body to fill said clearance space and directly contact said casing to provide a hermetic seal between said body and said casing.

3. In a capacitor of the miniature type, the combination of a cylindrical casing of ceramic material, said casing having an open end, a capacitor pack disposed in the casing and having a riser adjacent the open end of the casing, an external terminal mechanically and electrically secured to said riser to form a juncture, an encapsulation bead of air and moisture-resistant insulating mold material completely encasing said juncture and forming a solid incompressible body that completely seals the juncture, with the inner end of said body being larger than the outer end thereof and being of circular cross section, the diameter of said inner end corresponding to the inside diameter of the casing for snug, free-sliding movement relative thereto during insertion of said body into the casing, with there being a clearance space between the casing and the outer end of the bead, and a filler of air and moisture-resistant insulating material molded in direct, surrounding, contacting relation about said body to fill said clearance space and directly contact said casing to provide a hermetic seal between said body and said casing.

4. The method of manufacturing a capacitor of the type that includes a casing having an open end, a wound capacitor pack in said casing and including a riser adjacent the open end of said casing, an external terminal mechanically and electrically connected to said riser to form a juncture, and a solid body of air and moisture-resistant mold material in surrounding, sealing engagement about said juncture and filling the open end of said casing to provide a hermetic seal therefor, said method comprising the steps of forming an assembly of a capacitor pack, a riser, an external terminal forming a juncture with said riser, and a protection bead of said mold material encasing the juncture, dipping said assembly in an impregnation bath to impregnate said pack, then inserting the assembly in the casing with the bead disposed in the open end thereof and with the external terminal projecting therethrough, and filling the space between the bead and the walls of the casing with additional mold material to complete the formation of said body and create direct contact with said casing to provide a hermetic seal for the open end of said casing, said method also including the step of initially forming the protection bead with an enlarged inner end having a cross-sectional dimension corresponding to that of the open end of the casing to act as a barrier that protects the capacitor pack against ingress of mold material during the final formation of said body.

5. The method of manufacturing a capacitor of the type that includes a casing having an open end, a wound capacitor pack in said casing and including a riser adjacent the open end of said casing, an external terminal mechanically and electrically connected to said riser to form a juncture, and a solid body of air and moisture-resistant mold material in surrounding, sealing engagement about said juncture and filling the open end of said casing to provide a hermetic seal therefor, said method comprising the steps of forming an assembly of a capacitor pack, a riser, an external terminal forming a juncture with said riser, and a protection bead of said mold material encasing the juncture, dipping said assembly in an impregnation bath to impregnate said pack, testing the electrical characteristics of said assembly after impregnation of said pack, then inserting the assembly in the casing with the bead disposed in the open end thereof and with the external terminal projecting therethrough, and filling the space between the bead and the walls of the casing with additional mold material to complete the formation of said body and create direct contact with said casing to provide a hermetic seal for the open end of said casing, said method also including the step of initially forming the protection bead with an enlarged inner end having a cross-sectional dimension corresponding to that of the open end of the casing to act as a barrier that protects the capacitor pack against ingress of mold material during the final formation of said body.

References Cited in the file of this patent

UNITED STATES PATENTS

| | | |
|---|---|---|
| 790,749 | Ranney et al. | May 23, 1905 |
| 2,157,629 | Rolph | May 9, 1939 |
| 2,224,307 | Linder | Dec. 10, 1940 |
| 2,254,110 | Petrosky | Aug. 26, 1941 |
| 2,282,459 | Deeley | May 12, 1942 |
| 2,309,563 | Abeel | Jan. 26, 1943 |
| 2,622,133 | Dorst | Dec. 16, 1952 |
| 2,636,076 | Ness | Apr. 21, 1953 |
| 2,803,693 | Kurland et al. | Aug. 20, 1957 |
| 2,987,800 | Kurland et al. | June 13, 1961 |